United States Patent

Olso

[15] 3,663,883

[45] May 16, 1972

[54] DISCRIMINATOR CIRCUIT FOR RECORDED MODULATED BINARY DATA SIGNALS

[72] Inventor: Mitsuo Olso, Yokohama-shi, Japan

[73] Assignee: Fujitsu Limited, Kawasaki, Japan

[22] Filed: Nov. 28, 1969

[21] Appl. No.: 880,560

[30] Foreign Application Priority Data

Dec. 4, 1968 Japan....................................43/88785

[52] U.S. Cl. ..............................328/72, 178/69.5 R, 328/63, 328/120, 328/139, 328/164, 340/174.1 A

[51] Int. Cl. ..........................................................H03k 17/28

[58] Field of Search ................178/69.5 R; 307/269; 328/63, 328/72, 120, 139, 162, 164; 340/174.1 A

[56] References Cited

UNITED STATES PATENTS

| | | | |
|---|---|---|---|
| 3,116,456 | 12/1963 | Riker | 328/63 X |
| 3,339,157 | 8/1967 | Fiorino | 328/63 X |
| 3,404,232 | 10/1968 | Burford | 328/162 X |
| 3,422,425 | 1/1969 | Vallee | 328/63 X |
| 3,491,303 | 1/1970 | Gindi | 328/72 X |

*Primary Examiner*—John S. Heyman
*Assistant Examiner*—R. C. Woodbridge
*Attorney*—Curt M. Avery, Arthur E. Wilfond, Herbert L. Lerner and Daniel J. Tick

[57] ABSTRACT

A discriminator circuit discriminates recorded modulated binary data signals represented in accordance with whether a clock pulse is present in the interval between bits and a pulse is simultaneously present at the center of a bit. The discriminator circuit derives a data window signal for separating clock pulses and data pulses from the input data in a manner whereby when a pulse is absent from the center of a preceding bit the data window signal is derived in accordance with a pulse present in the interval between bits and when a pulse is present at the center of a preceding bit the data window signal is derived in accordance with the pulse at the preceding bit.

6 Claims, 19 Drawing Figures

DISCRIMINATOR CIRCUIT FOR RECORDED MODULATED BINARY DATA SIGNALS

DESCRIPTION OF THE INVENTION

Figure 1:
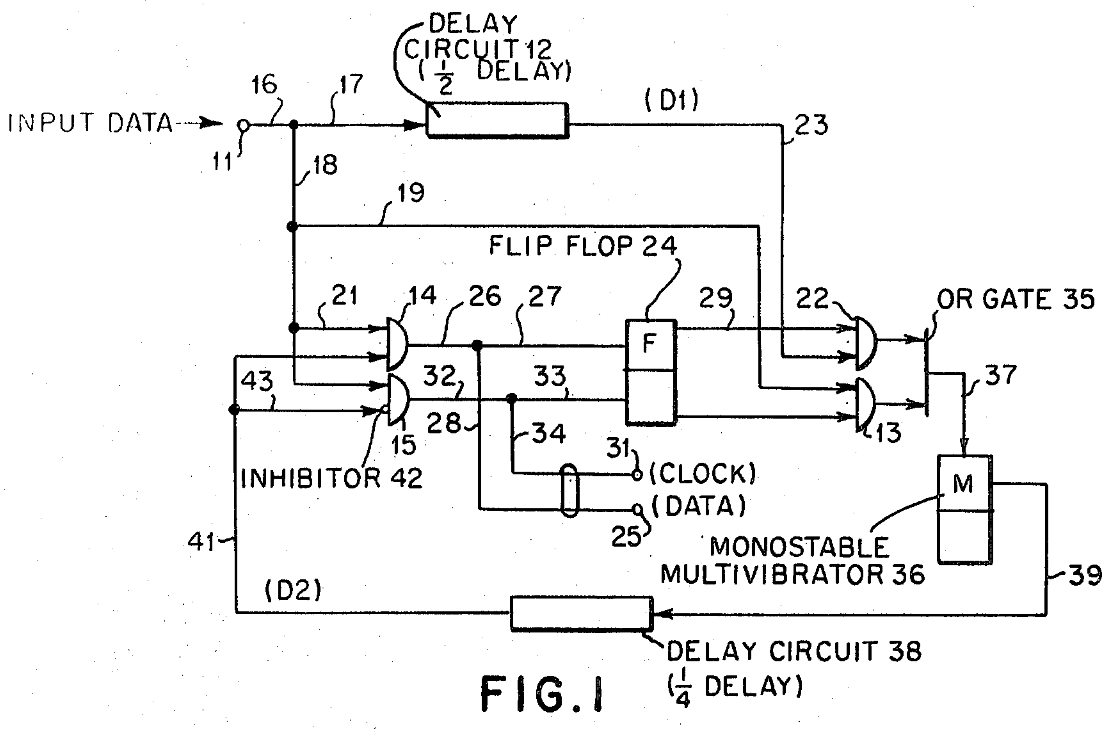

The invention relates to a discriminator circuit. More particularly, the invention relates to a discriminator circuit for recorded modulated binary data signals.

The discriminator circuit of the invention discriminates, detects or determines data read out from data recording media such as, for example, magnetic drums and magnetic disc packs.

The principal object of the invention is to provide a new and improved discriminator circuit for recorded modulated binary data signals.

An object of the invention is to provide a discriminator circuit for recorded modulated binary data signals which circuit operates with greater reliability than conventional data discriminator circuits of similar type.

An object of the invention is to provide a discriminator circuit for recorded modulated binary data signals, which circuit is of simple structure.

An object of the invention is to provide a discriminator circuit for recorded modulated binary data signals, which circuit functions with efficiency, effectiveness and reliability.

Data may be recorded or stored in magnetic drums, discs or disc packs by the use of a frequency modulation system. In a frequency modulation system, a data signal "1" is written at a pulse rate or frequency equal to one-half that of a data signal "0." The polarity is always converted in the interval between the bits. The part of the polarity which is converted in the interval between the bits is utilized as the clock gate signal reading data of the next bit in the read out operation. The polarity of the data signal "1" is converted at the center of the bit, and said signal and the clock signal must be read out by clearly separating each from the other. The polarity of the clock signal is converted in the interval between the bits. If data is read out from rotary recording media such as, for example, magnetic discs or drums, at a high density, the data signal position and the clock interval may become indistinct in time in the writing of data signal "0" due to a variation of frequency in the writing of the data signal "1." This is further described with reference to FIGS. 2*a* and 2*b*, as hereinafter described. For this reason, it is necessary to gate data signals without error by clock signals having variable time intervals. It is also required to clearly discriminate and separate clock signals from data signals.

The discriminator circuit of my invention, in separating pulses indicating clocks from pulses indicating data, forms the timing of derivation of separation gate signals, hereinafter referred to as data window signals, directly from clock pulses when there is no data pulse, and forms such timing by delaying data pulses when there are data pulses. Data window signals or pulses have heretofore been formed only from clock pulses. In accordance with the invention, however, the data window pulses may be formed by utilizing data pulses as well as clock pulses. The discriminator circuit of the invention completely satisfies the aforementioned requirement. Distortions are formed in the timing positions of the clock pulses, as hereinafter described, whereas there is no distortion in the timing positions of data pulses. The discriminator circuit of the invention thus has considerably enhanced reliability due to the derivation of data window pulses from data pulses of great reliability, which are far from distortion.

In accordance with the present invention, the discriminator circuit for recorded modulated binary data signals which are represented in accordance with whether a clock pulse is present in the interval between bits and a pulse is simultaneously present at the center of a bit, includes input means for providing input data including clock pulses and data pulses. A circuit having an output and an input connected to the input means derives a data window signal for separating clock pulses and data pulses from the input data in a manner whereby when a pulse is absent from the center of a preceding bit the data window signal is derived in accordance with a pulse present in the interval between bits. When a pulse is present at the center of a preceding bit the data window signal is derived in accordance with the pulse at the preceding bit. Output means connected to the output of the circuit provides clock pulses and data pulses detected by the discriminator circuit.

The circuit comprises a flip flop having a set input, a reset input, a set condition and a reset condition. Means is provided for supplying a data pulse to the flip flop to switch the flip flop to its set condition and for supplying a clock pulse to the flip flop to switch the flip flop to its reset condition.

The circuit further comprises a first gate circuit having an output, an input and another input connected to the flip flop and switched to conductive condition by the flip flop when the flip flop is in its set condition. Means is provided for supplying data pulses to the input of the first gate circuit so that the data pulses are transferred by the first gate circuit when the first gate circuit is in conductive condition.

The circuit further comprises a second gate circuit having an output, an input and another input connected to the flip flop and switched to conductive condition by the flip flop when the flip flop is in its reset condition. Means is provided for supplying clock pulses to the second gate circuit so that the clock pulses are transferred by the second gate circuit when the second gate circuit is in conductive condition.

The circuit further comprises a monostable multivibrator having an output and an input connected in common to the outputs of the first and second gate circuits.

The circuit further comprises a third gate circuit having an output connected to the set input of the flip flop and to the output means, an input connected to the input means and another input connected to the output of the monostable multivibrator. The third gate circuit is switched to conductive condition by the monostable multivibrator when the monostable multivibrator supplies a signal "1" thereto and transfers a data pulse to the output means when in conductive condition.

The circuit further comprises a fourth gate circuit having an output connected to the reset input of the flip flop and to the output means, an input connected to the input means and another input connected to the output of the monostable multivibrator. The fourth gate circuit is switched to conductive condition by the monostable multivibrator when the monostable multivibrator supplies a signal "0" thereto and transfers a clock pulse to the output means when in conductive condition. The flip flop is switched to its set condition by the third gate circuit when the third gate circuit is in conductive condition and is switched to its reset condition by the fourth gate circuit when the fourth gate circuit is in conductive condition.

Figure 4:
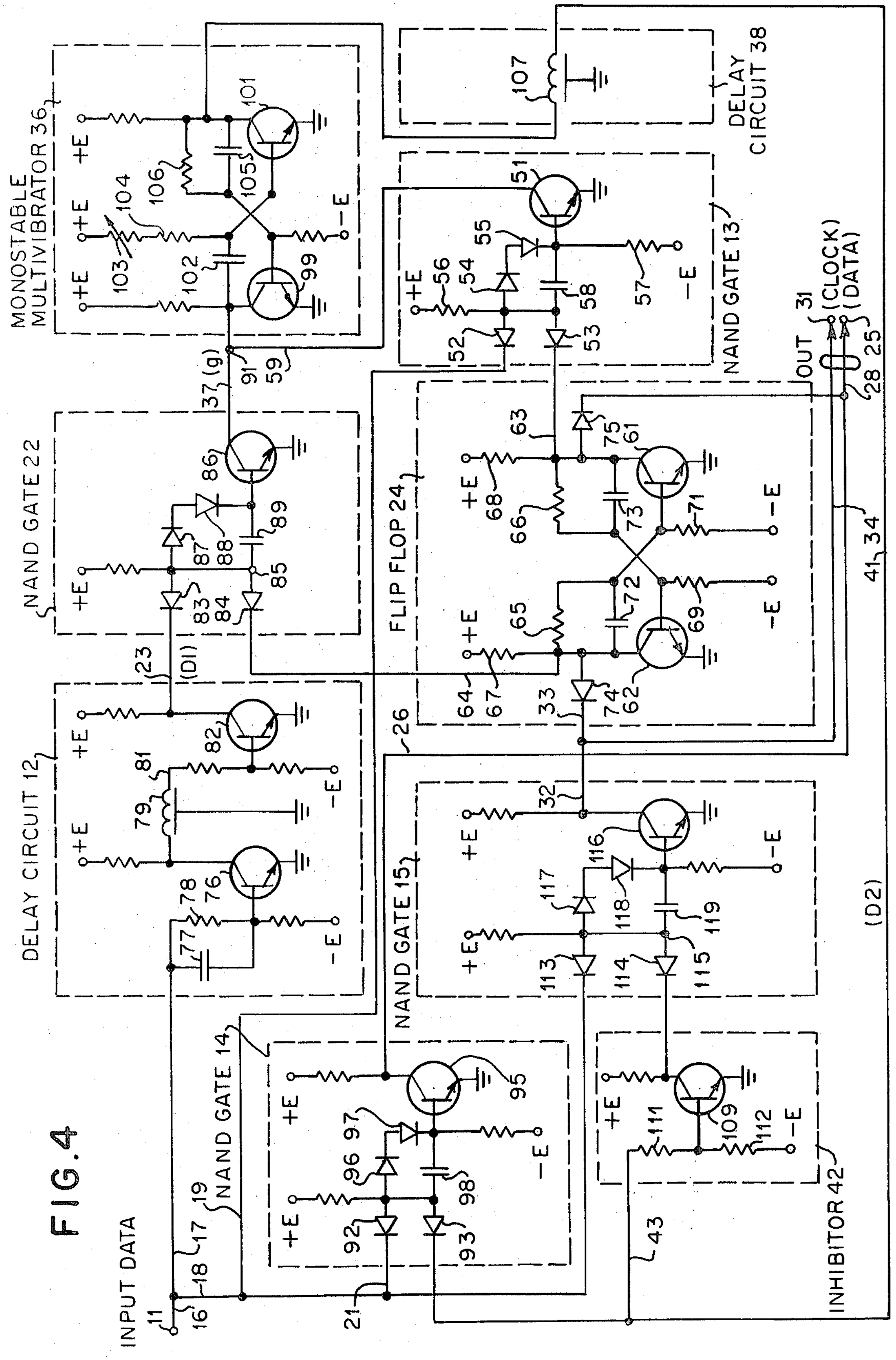

In order that the invention may be readily carried into effect, it will now be described with reference to the accompanying drawings wherein:

FIG. 1 is a block diagram of an embodiment of the discriminator circuit of the invention;

FIGS. 2*a* to 2*i* are graphical presentations illustrating the signals appearing at different points of the discriminator circuit of FIG. 1;

FIGS. 3*a* to 3*h* are graphical presentations illustrating the signals of FIGS. 2*b* to 2*i* as they appear in another embodiment of the discriminator circuit of the invention; and FIG. 4 is a circuit diagram of the discriminator circuit of FIG. 1.

In FIG. 1, input data derived from a recording or storage medium, is supplied to an input terminal 11 via a reading or sensing head and an amplifier (not shown in the FIGS.). The input terminal 11 is connected in common to the input of a delay circuit 12, a first input of a NAND gate 13, a first input of a NAND gate 14 and a first input of a NAND gate 15. The input terminal 11 is connected to the input of the delay circuit 12 via leads 16 and 17. The input terminal 11 is connected to the first input of the NAND gate 13 via the lead 16, a lead 18 and a lead 19. The input terminal 11 is connected to the first input of the NAND gate 14 via the leads 16 and 18 and a lead 21, and is connected to the first input of the NAND gate 15 via the leads 16 and 18.

The output of the delay circuit 12 is connected to a first input of a NAND gate 22 via a lead 23. The output of the NAND gate 14 is connected in common to the set input of a flip flop 24 and an output terminal 25. The output of the NAND gate 14 is connected to the set input of the flip flop 24 via leads 26 and 27 and is connected to the output terminal 25 via the lead 26 and a lead 28. The set output of the flip flop 24 is connected to the second input of the NAND gate 22 via a lead 29. The output of the NAND gate 15 is connected in common to the reset input of the flip flop 24 and an output terminal 31. The output of the NAND gate 15 is connected to the reset input of the flip flop 24 via leads 32 and 33 and is connected to the output terminal 31 via the lead 32 and a lead 34. The reset output of the flip flop 24 is connected to the second input of the NAND gate 13.

The output of the NAND gate 22 is connected to a first input of an OR gate 35 and the output of the NAND gate 13 is connected to the second input of the OR gate 35. The output of the OR gate 35 is connected to the input of a monostable multivibrator 36 via a lead 37. The output of the monostable multivibrator 36 is connected to the input of a delay circuit 38 via a lead 39. The output of the delay circuit 38 is connected in common to the second input of the NAND gate 14 via a lead 41 and an inhibitor 42 via the lead 41 and a lead 43. The inhibitor 42 is connected to the second input of the NAND gate 15.

The delay circuit 12 delays the input data by one-half period and the delay circuit 38 delays the input data by one-quarter period. The monostable multivibrator 36 represents the output signal "1," which is the eye level potential signal, during one-half period. Output data determined or discriminated from the input data by the discriminator circuit of FIG. 1 is provided at the output terminal 25. Clock signals determined or discriminated from the input data by the discriminator circuit of FIG. 1 are provided at the output terminal 31.

In accordance with the invention, data window pulses or signals for detecting only the data signals from the recorded signals read out by the monostable multivibrator 36 may be formed from both the clock pulses and the data pulses. In operation, the signals or data read out from the recording medium via a reading head are supplied to the discriminator circuit of FIG. 1 via the input terminal 11. A signal g for initiating the operation of the monostable multivibrator 36 via the NAND gate 13 is derived from the input data. The signal g, however, is derived from the input data directly, without delay, only when the flip flop 24 is in its reset condition, that is, when the NAND gate 13 is in its conductive condition.

Figures 2A, 2B, 2C, 2D, 2E, 2F, 2G, 2H, 2I:
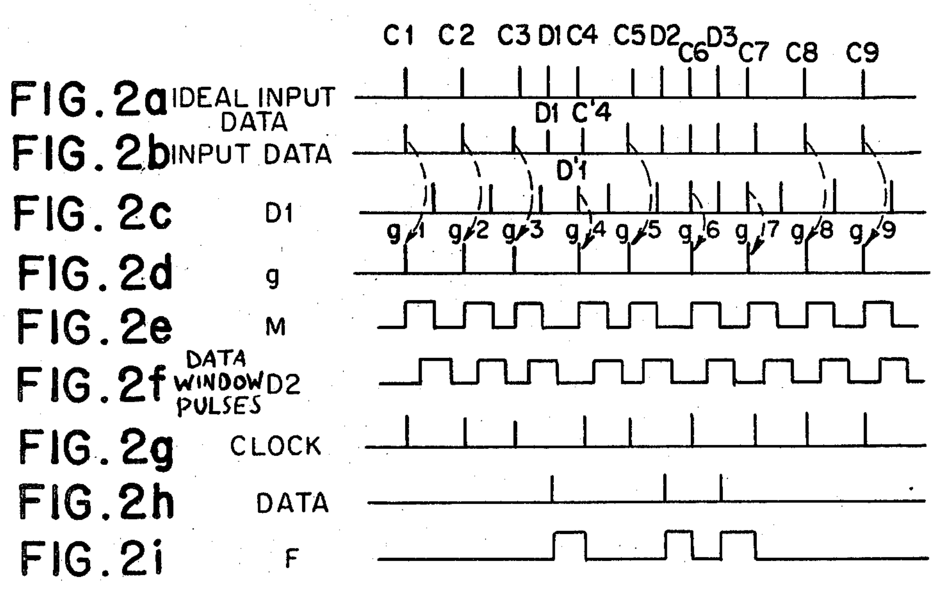
Figures 3A, 3B, 3C, 3D, 3E, 3F, 3G, 3H:
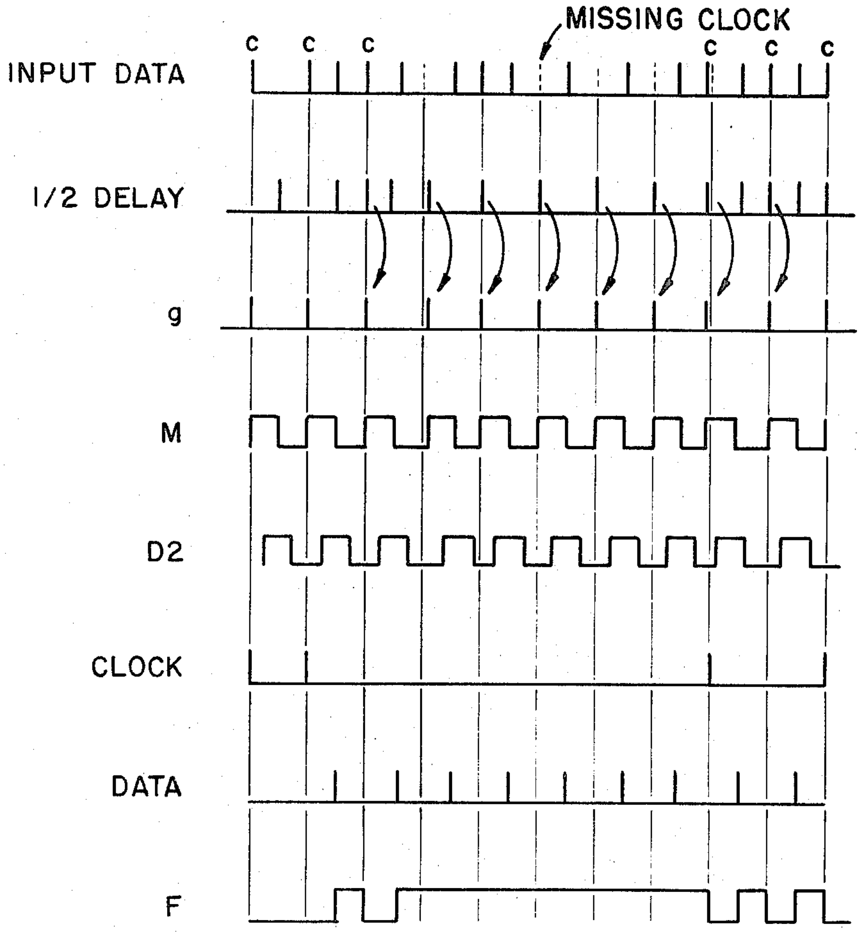

Since the flip flop 24 is first in its reset condition, the first input data C1, which is a clock signal, is derived directly, without delay, as indicated by the first waveform *g* of FIG. 2*d*. In other words, when the flip flop 24 is in its reset condition, as hereinbefore described, the input data itself is the signal *g*. This applies to the waveforms *g*2, *g*3, *g*5, *g*8 and *g*9. When the flip flop 24 is in its set condition, however, the waveform D1 is delayed, relative to the input data, by one-half period before it becomes the signal *g*. In this case, the input data passes through the delay circuit 12 and the NAND gate 22.

As seen in FIGS. 2*a* to 2*i*, the input data pulse C4 is actually delayed to the time position C′4, but the data signal "1," which is the waveform D1, is represented by the bit position C3 preceding the input data. In this case, therefore, the waveform D′1, which is delayed relative to the input data by one-half period, is utilized as the signal *g* for triggering the monostable multivibrator 36. It should be noted that the waveform D′1 is slightly ahead of the waveform C′4 in time. When data signal "1" is at the preceding bit position, as hereinbefore described, the flip flop 24 is set, the waveform *g*4, for triggering the monostable multivibrator 36 is thereby formed. Succeeding waveforms *g*6 and *g*7 may be formed in the same manner.

Generally, when there is a data signal "1," the next clock signal is delayed by said data signal. The circuit of my invention, however, permits the triggering of the monostable multivibrator 36 without delaying the clock signal. FIG. 2*a* discloses ideal input data. The actually available input data, however, has distortions, as shown in FIG. 2*b*. That is, clock signals on both sides of data signal "1" are shifted forward and backward. Thus, when there is a data signal "1," the clock signal preceding this bit is shifted further forward and the clock signal succeeding said bit is shifted further backward.

The waveforms of FIG. 2*c* are shifted from the input data illustrated in FIG. 2*b* by one-half period and may be provided by the delay circuit 12. FIG. 2*d* shows waveforms *g* for triggering the monostable multivibrator 36. When the input data signal is "0," the flip flop 24 is reset, so that the input data becomes waveform *g* without delay. When the input data signal is "1," the flip flop 24 is set, due to the aforedescribed circuit operation, and the output signals of the delay circuit 12, which are delayed by one-half period, become the waveforms *g*. This is illustrated in FIGS. 2*b*, 2*c* and 2*d* by broken line arrows.

The monostable multivibrator 36 is triggered by waveforms *g* and functions as indicated in FIG. 2*e*. The output waveforms of the monostable multivibrator 36 are further delayed by the delay circuit 38, by one-quarter period, and become the waveforms D2 illustrated in FIG. 2*f*. The waveforms D2 are the actual data window pulses. If the data signal "1" is the input data while the data window waveform D2 is at its high potential "1," the signal is read out as a data signal. That is, the data signal "1" is read out. If the input data signal "1" is supplied while the data window waveform D2 is at low potential or "0," said signal is read out as a clock signal. This is indicated by the gates 14 and 15.

The gate 14 is switched to its conductive condition when the data window waveform D2 is in its high potential or "1" condition, so that the data signal "1" is transmitted by said gate. This is illustrated in FIG. 2h. The gate 15 is in its conductive condition when the data window pulse D2 is in its low potential or "0" condition. This is due to the inhibit circuit 42, which converts a "1" signal to "0" and a "0" signal to a "1." In this case, a clock signal is transferred by the gate 15. The output terminal 25 thus provides data output signals from the gate 14 and the output terminal 31 provides clock output signals from the gate 15. The data and clock signals are provided at the output of the discriminator circuit of FIG. 1.

Data signals "1," as indicated in FIG. 2*h*, are transferred by the gate 14 and set the flip flop 24, as shown in FIG. 2*i*. When the flip flop 24 is set, it switches the gate 22 to its conductive condition, so that the waveforms D1 (FIG. 2*c*), delayed by one-half period by the delay circuit 12, become the waveforms *g* for triggering the monostable multivibrator 36.

As hereinbefore described, in accordance with the invention, when the data signal is "0," the clock pulse is utilized as the data window pulse for determining the input data, and when the data signal is "1," the data pulse, if present, rather than the next clock pulse, is utilized as said data window pulse. FIGS. 3*a* to 3*h* illustrate the waveforms relating to the missing clock pulse to which the discriminator circuit of the invention has been applied. The discriminator circuit of the invention may also be effectively applied to a recording system. The missing clock signal is utilized as the address mark in a disc pack apparatus. An address mark indicates a break point of the addresses. The address mark is recorded at the break point between a specific data field and the next data field. An address mark functions to set the flip flop 24 continuously for a constant period of time. Due to the continuous setting, a detector or discriminator circuit, separately provided, may detect the address mark. A break point between addresses, that is, between recording fields, may be detected by the detector circuit.

In FIG. 4, the input data supplied to the input terminal 11 is supplied to the NAND gate 13 via leads 16, 18 and 19. The NAND gate 13 provides the signal *g* for initiating the operation of the monostable multivibrator 36. The NAND gate 13 is a well known gate in NAND operation and comprises an inverting transistor 51, a plurality of diodes 52, 53, 54 and 55, a pair of resistors 56 and 57 and a capacitor 58. If the flip flop 24 is in its reset condition, the diode 53 of the NAND gate 13 is switched to its non-conductive condition and the change of the potential of the input data signal is directly transferred to the monostable multivibrator 36 via said NAND gate.

When the input data signal supplied via the lead 19 is at high potential, the transistor 51 of the NAND gate 13 is switched to its conductive condition and the collector electrode of said transistor has a low potential. When the input data signal is of low potential, the transistor 51 of the NAND gate 13 is switched to its non-conductive condition and the collector electrode of said transistor has a high potential. When the flip flop 24 is set, the diode 53 of the NAND gate 13 is switched to its conductive condition and the diode 52 is switched to its non-conductive condition. The change of the potential of the input signal in the lead 19 does not directly appear in the lead 59 connected to the collector electrode of the transistor 51. The NAND gate 13 thus performs a NAND logical operation. Each of the NAND gates 22, 14 and 15 functions, in NAND logical operation, in the same manner as the NAND gate 13.

When the flip flop 24 is reset, a transistor 61 thereof is switched to its non-conductive condition and a transistor 62 thereof is switched to its conductive condition. The flip flop 24 is thus switched to its reset condition. An output lead 63 of the flip flop 24 thus has a high potential, or logical signal "1" and an output lead 64 has zero or low potential or logical signal "0." The flip flop 24 is a well known circuit and comprises bias resistors 65, 66, 67, 68, 69 and 71, capacitors 72 and 73 and diodes 74 and 75. The diodes are utilized to switch the flip flop 24 from its reset condition to its set condition, or vice versa. The flip flop 24 is switched from its reset condition to its set condition, when the data signal is detected, that is, when the diode 75 is switched to its conductive condition. When the diode 75 is in its conductive condition, the base electrode of the transistor 62 has a low or zero potential and said transistor is switched to its non-conductive condition. The transistor 61 is then switched to its conductive condition. At such time, the lead 63 has a low or zero potential and switches the diode 53 of the NAND gate 13 to its conductive condition.

Pulses or signals "1" supplied via the input terminal 11 are fed to the delay circuit 12 and the NAND gate 13, the NAND gate 14 and the NAND gate 15, in common, as hereinbefore described with reference to FIG. 1. The signal "1" supplied to the delay circuit 12 is supplied to the base electrode of a transistor 76 via a capacitor 77 and a resistor 78. The signal "1" switches the transistor 76 to its conductive condition. Consequently, the potential of the collector electrode of the transistor 76 is rapidly decreased from +E volts, which is representative of the logical signal "1," to 0 volts, which is representative of the logical signal "0." The decrease of voltage is transferred to a delay line 79 and the pulse is delayed by one-half period. The output of the delay line 79, appearing in a lead 81, is then 0 volts.

A transistor 82 of the delay circuit 12 which is in conductive condition due to the −E potential source, is switched to its non-conductive condition by the 0 volt output of the delay line 79. Consequently, the collector electrode of the transistor 82 rapidly approaches +E volts from 0 volts and the collector potential is applied to the NAND gate 22 via the lead 23. The potential +E volts from the delay circuit is applied to a diode 83 of the NAND gate 22. The diode 83 is then switched from its conductive condition to its non-conductive condition. The gate 22 is switched to its conductive condition when a high voltage +E is applied to the lead 64 from the flip flop 24, indicating that said flip flop is in its set condition.

When there is a high potential +E on the lead 64, indicating that the flip flop 24 is in its set condition, a diode 84 of the NAND gate 22 is switched to its non-conductive condition. Since the diode 83 is in its non-conductive condition, the potential at a point 85 in the NAND gate 22 approaches +E volts. The voltage at the point 85 in the NAND gate 22 is applied to the base of a transistor 86 via a pair of diodes 87 and 88 and a capacitor 89. The potential of the base electrode of the transistor 86 nearly approaches +E volts. Consequently, the transistor 86, which is in its non-conductive condition, due to the −E volt supply voltage, is switched to its conductive condition. The collector voltage of the transistor 86 then becomes 0 volts and is applied to the monostable multivibrator 36 via the lead 37 and a circuit point 91 in said lead.

The pulse or signal supplied to the NAND gate 14 via the leads 16, 18 and 21, switches a diode 92 of said gate from its non-conductive condition to its conductive condition. If it is assumed that there is a high potential on the lead 41 from the delay circuit 38 to the NAND gate 14, a diode 93 of said NAND gate is switched to its non-conductive condition. A high potential +E is therefore provided at a circuit point 94 of the gate 14. The potential of the base electrode of a transistor 95 of the gate 14 is thus increased by diodes 96 and 97 and a capacitor 98. That is, the transistor 95, which is in non-conductive condition, due to the −E power supply, is switched to its conductive condition. The voltage of the collector electrode of the transistor 95 becomes approximately 0 volts.

Due to the collector voltage of the transistor 95 becoming approximately 0 volts, the flip flop 24 is immediately switched to its set condition. That is, the diode 75 of the flip flop 24 is switched to its conductive condition and consequently the collector potential of the transistor 61 is rapidly decreased from +E volts to 0 volts. The 0 volt collector potential is applied to the base electrode of the transistor 62 of the flip flop 24 via the capacitor 73 and the resistor 66 and reduces the base voltage of the transistor 62 to 0 volts. Consequently, the transistor 62 is switched from its conductive condition to its non-conductive condition. The collector voltage of the transistor 62 then changes from 0 volts to +E volts.

When the collector potential of the transistor 62 of the flip flop 24 becomes +E volts, the potential of the base electrode of the transistor 61 approaches +E volts via the resistor 65 and the capacitor 72. The transistor 61 is then switched from its non-conductive condition to its conductive condition, so that the flip flop 24 is switched from its reset condition to its set condition. The collector potential of the transistor 61 is then 0 volts. The 0 volts is applied to the diode 53 of the NAND gate 13 via the lead 63.

The NAND gate 13 is in its non-conductive condition as long as 0 volts is applied to the lead 63 as a result of the flip flop 24 being in its set condition. The NAND gate 22, however, is in its conductive condition. This is due to the fact that there is a high level potential of "1" applied to the lead 64 so that the diode 84 of the NAND gate 22 is in its non-conductive condition. Thus, when the flip flop 24 is in its reset condition, the signal *g* at the circuit point 91 of the lead 37 becomes logical "1" due to the output signal from the NAND gate 13 in the lead 59. When the flip flop 24 is in its set condition, however, the signal *g* becomes logical "1" due to the output signal from the NAND gate 22 in the lead 37. In other words, the circuit point 91 functions as the OR gate 35 of FIG. 1 and transfers the output signal of either the gate 13 or the gate 22.

The monostable multivibrator 36 is a well known monostable multivibrator circuit and comprises two transistors 99 and 101, a charging and discharging capacitor 102, charging resistors 103 and 104, a capacitor 105 and a resistor 106. Operation of the monostable multivibrator 36 is initiated when input pulses are supplied thereto via a lead 37. An output signal 1 is provided in the output lead 39 of the monostable multivibrator 36 for a constant period of time. Input pulses to the monostable multivibrator 36, passing through the circuit point 91, have a potential which is the reverse of the ordinary potential, that is, the input pulses to the monostable multivibrator have a 0 volt potential. The pulses are ordinarily of high potential, but become 0 potential during the time that pulses are supplied.

The pulses supplied to the monostable multivibrator 36 trigger said monostable multivibrator. That is, when the potential at the circuit point 91 is decreased from +E to 0, the 0 potential is applied to the base electrode of the transistor 101 of the monostable multivibrator 36 via the capacitor 102, which is in its discharge condition. As a result, the transistor 101 is switched from its conductive condition to its non-conductive condition. The collector potential of the transistor 101 is changed from 0 to a high magnitude of +E. The +E volt collector potential of the transistor 101 is applied to the base electrode of the transistor 91 via the capacitor 105 and the resistor 106. The transistor 99 is thus switched from its non-conductive condition to its conductive condition. At such time, the capacitor 102 commences to be charged in accordance with the time constant determined by the magnitudes of the resistors 103 and 104 and the capacitor 102.

The collector potential of the transistor 99 is maintained at 0 volts due to the conductive condition of said transistor, even after the input pulse at the circuit point 91 in the lead 37 is gone. When the capacitor 102 commences to be charged, the base potential of the transistor 101 gradually increases. When the base potential of the transistor 101 reaches a constant magnitude, said transistor is switched from its non-conductive to its conductive condition. Consequently, the collector potential of the transistor 101 is again decreased from +E to 0 volts. The 0 volt potential is applied to the base electrode of the transistor 99 via the resistor 106 and the capacitor 105. The transistor 99 is consequently switched from its conductive condition to its non-conductive condition.

When the capacitor 102 is charged for a constant period of time, the monostable multivibrator 36 is restored to its initial stable condition. During such period of time, a high potential of logical "1" is applied to the lead 39. The logical "1" condition is illustrated in FIG. 2*e*. The pulses of FIG. 2*e*, which are provided in the lead 39, have a duration which is equal to one-half the interval between bits. These pulses are further delayed by one-quarter period by the delay circuit 38.

The delay circuit 38 comprises a delay line 107. Signals supplied to the delay circuit 38 are fed to the NAND gate 14 via the lead 41 and are fed to the inverter or inhibitor 42 via the leads 41 and 43. The diode 93 of the gate 14 is switched to its non-conductive condition during the period of duration of the pulse of the signal provided in the lead 41 from the delay circuit 38, that is, during the period of duration of logic signal "1." That is, during the duration time of the one-half period pulse the gate 14 is in its conductive condition and only the polarity of the input data signal supplied via the leads 16, 18 and 21 is changed without modification of the time relation. The input data signal is then transferred via the lead 26. The data signal in the lead 26 is provided at the output terminal 25 via the lead 28. The signal D2, which is supplied to the inverter or inhibitor 42 via the leads 41 and 43, from the delay circuit 38, in inverted by said inhibitor or inverter without delay during the duration of the pulse in said leads, that is, during the duration of the logical signal "1." The inhibited or inverted signal is provided via a lead 108. The inhibitor or inverter 42 is a well known inverter or inhibitor circuit and comprises a transistor 109 and a pair of resistors 111 and 112. Thus, as hereinbefore described, when a logical "0" signal is supplied to the inhibitor 42 via the leads 41 and 43, a logical "1" signal is supplied via the lead 108 from said inhibitor to the NAND gate 15.

At the time that a logical "1" signal is supplied to the gate 15 via the lead 108, the input pulse in the lead 18 is supplied to the output lead 32, via said gate, without delay. Thus, if a high potential is applied to the lead 18 while a high potential, or logical signal "1," is applied to the lead 108, diodes 113 and 114 of the gate 15 are switched to their non-conductive condition and a high potential is applied to a circuit point 115 of said gate. The potential at the circuit point 115 is applied to a transistor 116 of the NAND gate 15 via diodes 117 and 118 and a capacitor 119. The potential applied to the transistor 116 switches said transistor to its conductive condition.

The transistor 116 remains in its conductive condition for a period of time equal to that during which a logical "1" signal is supplied via the lead 18 to the gate 15, that is, the period of the pulse duration. At such time, the clock pulse of the input data is transferred through the gate 15, wherein the polarity of said clock pulse is inverted, and is transferred via the leads 32 and 34 to the output terminal 31. The clock signal is thus provided at the output terminal 31, independently of the output terminal 25, at which the data signal is provided. When the clock signal is provided or detected, the diode 74 of the flip flop 24 is switched to its conductive condition and said flip flop is switched from its set condition to its reset condition. The flip flop 24 is switched from its reset condition to its set condition upon the next determination or detection of the data signal.

If the discriminator circuit of the invention is applied to data recording devices such as, for example, magnetic discs and magnetic drums, time shifting due to distortions of the input data provided by the recording medium may be reduced by half and read out error from the recording device may be reduced. The discriminator circuit of the invention thus provides a data processing system of high reliability.

While the invention has been described by means of a specific example and in a specific embodiment, I do not wish to be limited thereto, for obvious modifications will occur to those skilled in the art without departing from the spirit and scope of the invention.

I claim:

1. A discriminator circuit for separating clock pulses and data pulses from input data, said discriminator circuit including input means for providing input data in a pulse train including clock pulses and data pulses;

circuit means having an input terminal and an output terminal and connected to said input means for generating data window gate signals by the succeeding clock pulse of two adjacent clock pulses in the input data pulse train when no data pulse exists between said two clock pulses, generating the data window gate signals by the data pulse when a data pulse exists between said two clock pulses, and separating the clock pulses and the data pulses from the input data pulse train by the data window gate signals, said circuit means comprising delay means, a flip flop having a set input, a reset input, a set condition and a reset condition, a first gate circuit having an output terminal, an input terminal connected to the input means through the delay means and another input terminal connected to said flip flop and switched to conductive condition by data pulses derived from the input data through the delay means when said flip flop is in its set condition and means for supplying data pulses to the input terminal of said first gate circuit so that said data pulses are transferred by said first gate circuit when said first gate circuit is in conductive condition; and output means connected to the output terminal of said circuit means for providing clock pulses and data pulses detected by said discriminator circuit.

2. A discriminator circuit as claimed in claim 1, wherein said circuit means further comprises a second gate circuit having an output terminal, an input terminal connected to the input means and another input terminal connected to said flip flop and switched to conductive condition by clock pulses derived from the input data when said flip flop is in its reset condition and means for supplying clock pulses to the input terminal of said second gate circuit so that said clock pulses are transferred by said second gate circuit when said second gate circuit is in conductive condition.

3. A discriminator circuit as claimed in claim 2, wherein said circuit means further comprises a monostable multivibrator having an output and an input connected in common to the outputs of said first and second gate circuits.

4. A discriminator circuit as claimed in claim 3, wherein said circuit means further comprises a third gate circuit having an output connected to the set input of the flip flop and to said output means, an input connected to said input means and another input connected to the output of said monostable multivibrator, said third gate circuit being switched to conductive condition by said monostable multivibrator when said monostable multivibrator supplies a signal "1" thereto and transferring a data pulse to said output means when in conductive condition.

5. A discriminator circuit as claimed in claim 4, wherein said circuit means further comprises a fourth gate circuit having an output connected to the reset input of the flip flop and to said output means, an input connected to said input means and another input connected to the output of said monostable multivibrator, said fourth gate circuit being switched to conductive condition by said monostable multivibrator when said monostable multivibrator supplies a signal "0" thereto and transferring a clock pulse to said output means when in conductive condition.

6. A discriminator circuit as claimed in claim 5, wherein said flip flop is switched to its set condition by said third gate circuit when said third gate circuit is in conductive condition and is switched to its reset condition by said fourth gate circuit when said fourth gate circuit is in conductive condition.

* * * * *